United States Patent
Hoch et al.

(10) Patent No.: US 7,180,867 B2
(45) Date of Patent: Feb. 20, 2007

(54) APPARATUS AND METHOD FOR FLOW PATH BASED FAULT DETECTION AND SERVICE RESTORATION IN A PACKET BASED SWITCHING SYSTEM

(75) Inventors: Thomas A Hoch, Boxborough, MA (US); John Patrick Jones, Westford, MA (US); Andrew A Long, Northborough, MA (US); Prasasth R Palnati, Westford, MA (US); Ronald M Parker, Boxborough, MA (US); Raymond J Schmidt, Stoughton, MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 1259 days.

(21) Appl. No.: 09/748,419

(22) Filed: Dec. 26, 2000

(65) Prior Publication Data

US 2002/0080723 A1 Jun. 27, 2002

(51) Int. Cl.
*H04J 3/16* (2006.01)
*H04L 12/26* (2006.01)
*H04L 12/28* (2006.01)

(52) U.S. Cl. .................... 370/244; 370/217; 370/248; 370/250

(58) Field of Classification Search ........ 370/217–220, 370/225, 242–244, 248, 249, 250, 389, 395.1, 370/395.21, 395.43, 419, 428
See application file for complete search history.

(56) References Cited

U.S. PATENT DOCUMENTS

| | | | | |
|---|---|---|---|---|
| 5,909,427 A * | 6/1999 | Manning et al. | ............. | 370/219 |
| 5,999,528 A * | 12/1999 | Chow et al. | ................ | 370/365 |
| 6,067,286 A * | 5/2000 | Jones et al. | ................ | 370/218 |
| 6,256,291 B1 * | 7/2001 | Araki | ......................... | 370/216 |
| 6,269,081 B1 * | 7/2001 | Chow et al. | ................ | 370/241 |
| 6,332,198 B1 * | 12/2001 | Simons et al. | ................. | 714/6 |
| 6,370,155 B1 * | 4/2002 | Cantwell et al. | ............ | 370/465 |
| 6,850,531 B1 * | 2/2005 | Rao et al. | ................... | 370/401 |

\* cited by examiner

*Primary Examiner*—Hanh Nguyen
*Assistant Examiner*—Ahmed Elallam
(74) *Attorney, Agent, or Firm*—Matthew J. Hodulik (57) ABSTRACT

A methodology is provided for fault detection and service restoration in a multiservice switch on a per flow basis. An ingress source transmits the same data over each of two redundant cores. An egress receiver selects on a per flow bass which core to utilize. Bi-directional flows are not necessarily grouped together. The basic approach to fault detection is to assume that the two cores are not in lock step, but that the shelves are continually monitoring link flows for control path data as well as user data. The path monitoring is accomplished using a combination of arbiter and aggregator functions found in the service shelves and core interface cards, respectively. The arbiter transmits link test cells to both cores on a per flow basis, wherein the link test cells traverse and are monitored by respective aggregators to and from each core. When an egress arbiter determines that a flow is bad, it initiates a switch to the alternative source core, from which the flow would continue.

23 Claims, 10 Drawing Sheets

FIG. 8
END TO END TEST CELL FLOW, ARB<>ARB

LTC GENERATOR TABLE

| x,y (10 bits) INDEX (1K) | ENABLE TX FOR FLOW | | | | | | | | POINTER TO NEXT FLOW (10 bits) |
|---|---|---|---|---|---|---|---|---|---|
| | Z7 | Z6 | Z5 | Z4 | Z3 | Z2 | Z1 | Z0 | |
| 0 | 1/0 | 1/0 | 1/0 | 1/0 | 1/0 | 1/0 | 1/0 | 1/0 | |
| .... | 1/0 | 1/0 | 1/0 | 1/0 | 1/0 | 1/0 | 1/0 | 1/0 | |
| 1048 | 1/0 | 1/0 | 1/0 | 1/0 | 1/0 | 1/0 | 1/0 | 1/0 | |

LTC GENERATOR FIELD DEFINITIONS

| FIELD | DEFINITION |
|---|---|
| Z7–Z0 | ENABLE TEST CELL GENERATION FOR THE PARTICULAR Z FLOW. 1 = SEND LTC ON FLOW 0 = DO NOT SET LTC ON FLOW |
| PTR | POINT TO NEXT LOCATION OR NEXT FLOW IN THIS TABLE THAT CONTAINS TEST CELL INFORMATION TO SEND. |

LTC RECEIVER TABLE

| x.y (10 bits) INDEX (1K) | ENABLE CHECK [7:0] | | ENABLE CHECK [7:0] | | CELL RCVD [7:0] | | CELL RCVD [7:0] | | FAULT [7:0] | | FAULT [7:0] | | COUNT [9:0] | | COUNT [9:0] | | ERROR CNT [3:0] | ERROR CNT [3:0] |
|---|---|---|---|---|---|---|---|---|---|---|---|---|---|---|---|---|---|---|
| | CORE 0 | CORE 1 | | | CORE 0 | | CORE 1 | | CORE 0 | | CORE 1 | | CORE 0 | | CORE 1 | | CORE 0 | CORE 1 |
| 0 | XXXXXXXX | XXXXXXXX | | | XXXXXXXX | | XXXXXXXX | | XXXXXXXX | | XXXXXXXX | | XXXXXXXXXX | | XXXXXXXXXX | | XXXX | XXXX |
| ... | XXXXXXXX | XXXXXXXX | | | XXXXXXXX | | XXXXXXXX | | XXXXXXXX | | XXXXXXXX | | XXXXXXXXXX | | XXXXXXXXXX | | XXXX | XXXX |
| 1023 | XXXXXXXX | XXXXXXXX | | | XXXXXXXX | | XXXXXXXX | | XXXXXXXX | | XXXXXXXX | | XXXXXXXXXX | | XXXXXXXXXX | | XXXX | XXXX |

LTC GENERATOR FIELD DEFINITIONS

| FIELD | DEFINITION |
|---|---|
| ENABLE CHECK | ENABLE TEST CELL VERIFICATION FOR THAT x.y.z. |
| CELL RCVD | SET WHEN A CELL COMES IN ON A FLOW. CLEARED BY TABLE CHECKER. |
| FAULT | SET WHEN A LINK IS DECLARED FAULTED, RESET WHEN LINK IS DECLARED GOOD. |
| COUNT | START COUNTING UP WHEN THE TABLE HAS BEEN SCANNED AND ENABLE IS SET FOR A FLOW BUT A LTC HAS NOT BEEN RECEIVED ON THAT FLOW. WHEN THE PROGRAMMABLE THRESHOLD THAT INDICATES WHEN TO FLAG A FLOW AS BAD IS REACHED, AND INTERRUPT WILL BE GENERATED TO THE PROCESSOR INTERFACE. ANY Z CAN BE 'BAD' FOR THE COUNT TO INCREMENT FOR THE x.y. WHEN THERE ARE NO ERRORS AFTER AN ERROR CONDITION, THIS WILL START TO COUNT THE NUMBER OF GOOD CHECK CYCLES FOR A FLOW. AFTER THE PROGRAMMABLE THRESHOLD THAT INDICATES WHEN A FLOW IS CONSIDERED GOOD IS REACHED THE FLOW IS DECLARED GOOD AND THE PROCESSOR IS NOTIFIED VIA AN INTERRUPT IF ENABLED. |
| ERROR CNT | COUNT OF TEST CELLS WITH FIXED PAYLOAD ERRORS. |

APPARATUS AND METHOD FOR FLOW PATH BASED FAULT DETECTION AND SERVICE RESTORATION IN A PACKET BASED SWITCHING SYSTEM

RELATED APPLICATION

This application is related to U.S. patent application Ser. No. 09/711,997, entitled Apparatus and Method For Redundancy Of Processing Modules Interfaced To A Switching Core and filed Nov. 11, 2000, now U.S. Pat No. 6,894,969.

FIELD OF THE INVENTION

The present invention relates generally to communication systems and more particularly to packet switching systems having redundancy protection.

BACKGROUND OF THE INVENTION

Multiservice switches used, for example, by communications providers in wide area networks typically provide a number of different interfaces for incoming and outgoing communications traffic to the core switching fabric in order to accommodate customer needs. These interfaces can range, for example, from high rate optical trunking ports to lower rate electrical interfaces. In general, the different interfaces are provided through service specific equipment grouped together on what are termed "service shelves", where the service shelves then couple to the switching core. A typical service shelf will include the physical layer interface which couples to higher layer service cards (e.g. layer 2 or 3 for ATM or IP) and then to the switching core. Failure protection of equipment utilized in multiservice switches usually in the form of redundant circuit paths is also extremely important in order to provide the type of reliability that is necessary for these switches. That is, the ability to detect faults in a packet switching system and restore service quickly is an important issue in overall availability to the customer. Extra service cards (or protection cards) and even redundant switching cores are often provided within a service shelf to allow for the required fault protection.

In prior art multiservice switches of the type described above, when a fault is detected in a communications link within the switch, entire shelves of service cards or entire switching cores are required to be switched in response to the detected fault. This causes interruptions on all portions of the switching system beyond those that have failed. This is a disadvantage in that the greater the number of communications links that are affected, the greater the chance is that data will be lost or communications will be disrupted during or as a result of the switchover. Accordingly, there is a need to provide a system that better isolates failures in one part of the system from other areas of the packet switching system.

SUMMARY OF THE INVENTION

The present invention is a methodology for providing fault detection and service restoration for a multiservice switch on a per flow basis. An ingress source transmits the same data over each of the redundant cores. An egress receiver selects on a per flow basis which core to utilize. Bi-directional flows are not necessarily grouped together. That is, for a duplex path, one direction of transmission can proceed through a first core and the other direction can proceed through the other core if required.

The basic approach to fault detection is to assume that the two cores are not in lock step, but that the shelves are continually monitoring link flows for flow control data as well as user data. The flow monitoring is done largely in dedicated hardware and the status is passed up to a local processor within a service shelf in order that recovery can proceed quickly. The flow monitoring is accomplished using a combination of arbiter and aggregator functions found in the service shelves and core interface cards, respectively. The arbiter transmits (on ingress) link test cells to both cores on a per flow basis, which are received and monitored at each arbiter on the egress side.

When an egress arbiter determines that a flow is bad, it initiates a switch to the alternative source core, from which the flow would continue. A unique aspect of the present invention is that no notification need be sent to the ingress source because there is no coupling from a switchover basis of duplex flows. The ARB performs steering on a per flow basis as to which traffic is to be accepted between core 0 and core 1. Control and link validation traffic can be accepted from either core in parallel. At all times, a full communications traffic load is transitioning both of the cores. There is no inherent primary and secondary core, however, except from the standpoint of which core a respective arbiter will accept data at startup under software control when both cores are fully functional. In all cases, data is transmitted through both cores such that failures in an internal switch function or link is not propagated by a failure to other flows.

BRIEF DESCRIPTION OF THE DRAWINGS

A more complete understanding of the present invention may be obtained from consideration of the following detailed description of the invention in conjunction with the drawing, with like elements referenced with like references, in which.

DETAILED DESCRIPTION

Multiservice switches used by communications providers for wide area networks typically provide a number of different interfaces for access to and from the core switching fabric in order to accommodate customer needs. As discussed in the background, the different interfaces may be provided through service shelves which then couple to the switching core.

Figure 1:
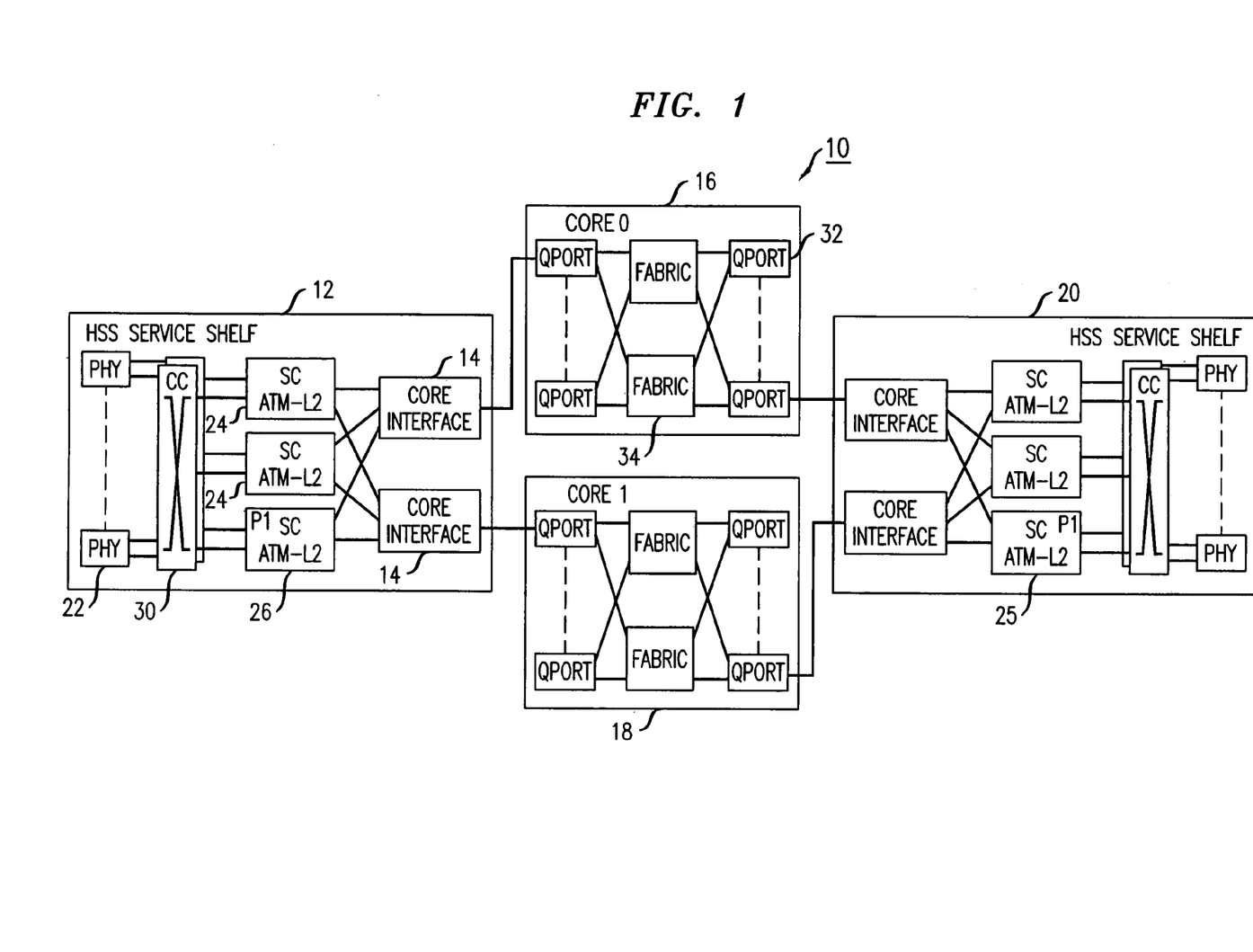
FIG. 1 is a high level diagram of a multiservice switch incorporating the core interface device of the present invention.

Referring to FIG. 1, there is shown one exemplary embodiment of a multiservice switch 10. The switch includes a service shelf 12 which incorporates a core interface module 14. As would be understood, the functional blocks illustrated in the figure may take the form of one or more cards or modules that are insertable into a rack or other similar type system. The service shelf 12 couples to first and second redundant switching cores 16, 18. A second service shelf 20 couples to what can be considered the output side of the switching cores.

As shown, the general makeup of the service shelf 12 includes a physical layer interface card 22 which is a user interface that can be an optical or electrical interface, e.g., DS3, OC-12, OC-48, OC-192, etc. In the case of the high speed shelf shown, the physical layer is generally a high density optical interface such as OC-48 or OC-192. The physical layer card 22 couples to higher level service cards 24, 26 (for example, layer 2 or layer 3 for ATM or IP) through a cross connect device, for example, a SONET STS-1 level cross-connect. The service cards 24 couple to the switching core through core interface modules 14. As shown, the switching cores 16, 18 are traditional switch cores including input/output ports 32 as well as switching fabrics 34.

The interface mechanism between the service cards 12 and the core 16, 18 provides redundancy protection between the service cards and core without the requirement that extra core bandwidth be allotted for the protection cards. As shown in the exemplary embodiment, two on-line ATM service cards 24 are protected by one back-up or protect service card 26. The core interface card 14 permits routing of core data to and from any of the three cards. In addition, the protection card 26 can be switched in place without the corresponding re-routing having to be known to the rest of the system.

The present invention is a methodology for providing fault detection and service restoration for a multiservice switch on a per flow basis. Referring still to FIG. 1, ingress data (e.g., communicating through the first service shelf 12 and one of the on-line service cards 24) transmits the same data over each of the redundant cores 16, 18. An egress receiver 25 (in the second service shelf 20) selects on a per path basis which core to utilize. Bi-directional paths are not necessarily grouped together. That is, for a duplex path, one direction of transmission can proceed through the first core 16 and the other direction can proceed through the other core 18, if required.

The basic approach to fault detection is to assume that the two cores 16, 18 are not in lock step, but that the shelves 12, 20 are continually monitoring link flows for flow control data as well as user data. The flow monitoring is done largely in dedicated hardware and the status is passed up to a local processor within a service shelf 12, 20 in order that recovery can proceed quickly. As will be explained in greater detail, the flow monitoring is accomplished using a combination of arbiter and aggregator functions (shown in FIG. 2) found in the service shelves 12, 20 and core interface cards 14, respectively. The arbiter (ARB) transmits (on ingress) link test cells to both cores on a per flow basis, which are received and monitored at each arbiter on the egress side.

When an egress arbiter determines that a flow is bad, it initiates a switch to the alternative source core, from which the flow would continue. A unique aspect of the present invention is that no notification need be sent to the ingress source because there is no coupling from a switchover basis of duplex flows. The ARB performs steering on a per flow basis as to which traffic is to be accepted between core 0 and core 1. Control and link validation traffic can be accepted from either core in parallel. At all times, a full communications traffic load is transitioning both of the cores. There is no inherent primary and secondary core, however, except from the standpoint of which core a respective arbiter will accept data at startup under SW control. In all cases, data is transmitted through both cores. Note that in all cases, full core bandwidth is available to the shelves.

Figure 2:
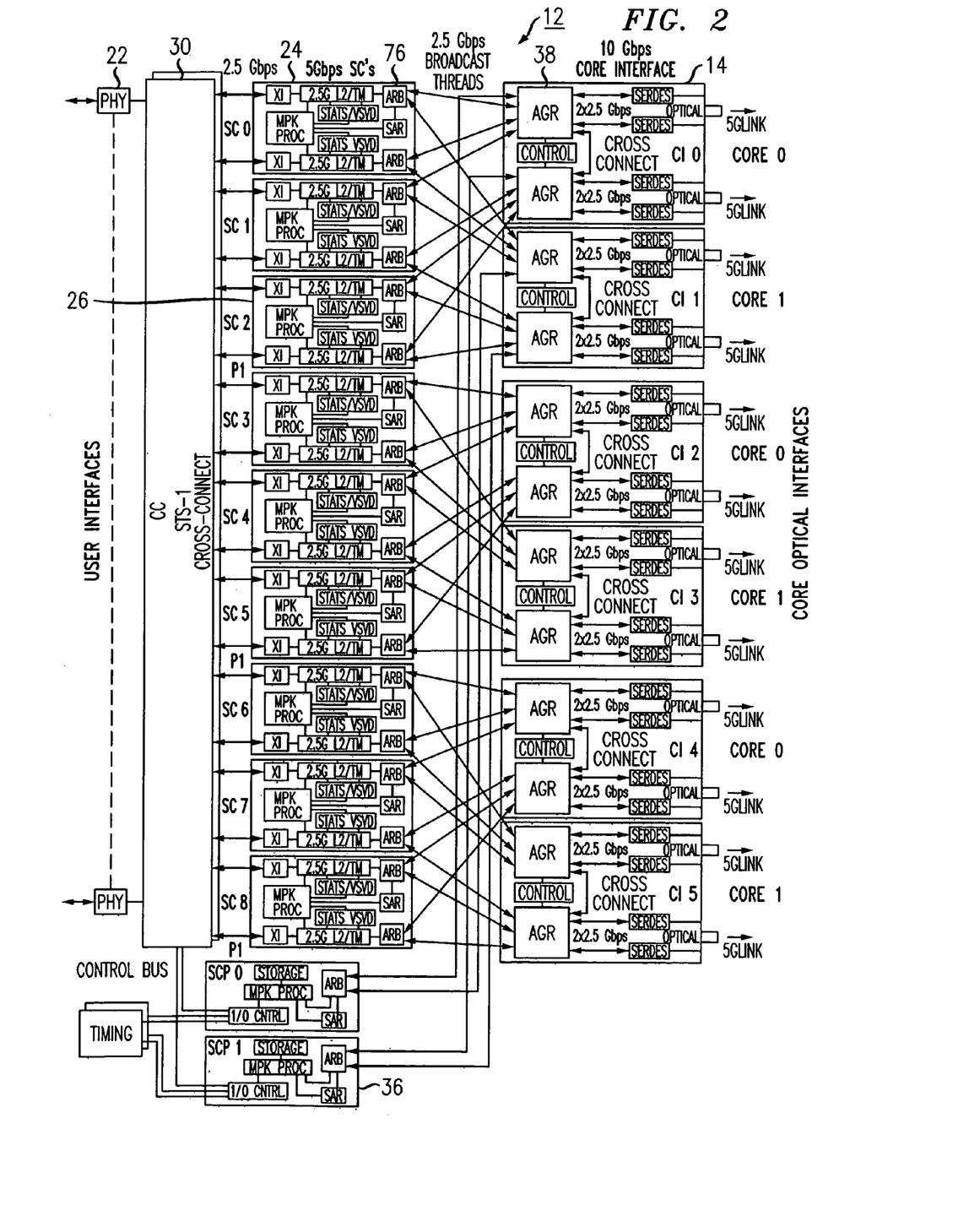
FIG. 2 is an exemplary block diagram of a high speed service shelf in accordance with the present invention.

In order to more clearly understand the present invention, an exemplary structure of a multiservice switch will now be described. Referring to FIG. 2, a detailed block diagram of a service shelf 12 in accordance with the present invention is shown. FIG. 2 illustrates the interface between the service cards 24, 26 and the switching core via the core interface modules 14, where the specific interconnects between the service cards and the core interface are shown. In the exemplary embodiment, the service shelf 12 includes nine service cards (SC0–SC8) which couple, respectively, to six core interface cards (CI0–CI5). As in FIG. 1, two on-line service cards 24 and one protect service card 26 couple to the switching cores through each core interface card providing 1:2 redundancy. Also included in the service shelf are shelf control processor cards 36 which handle administrative processing functions for the shelf.

Figure 3:
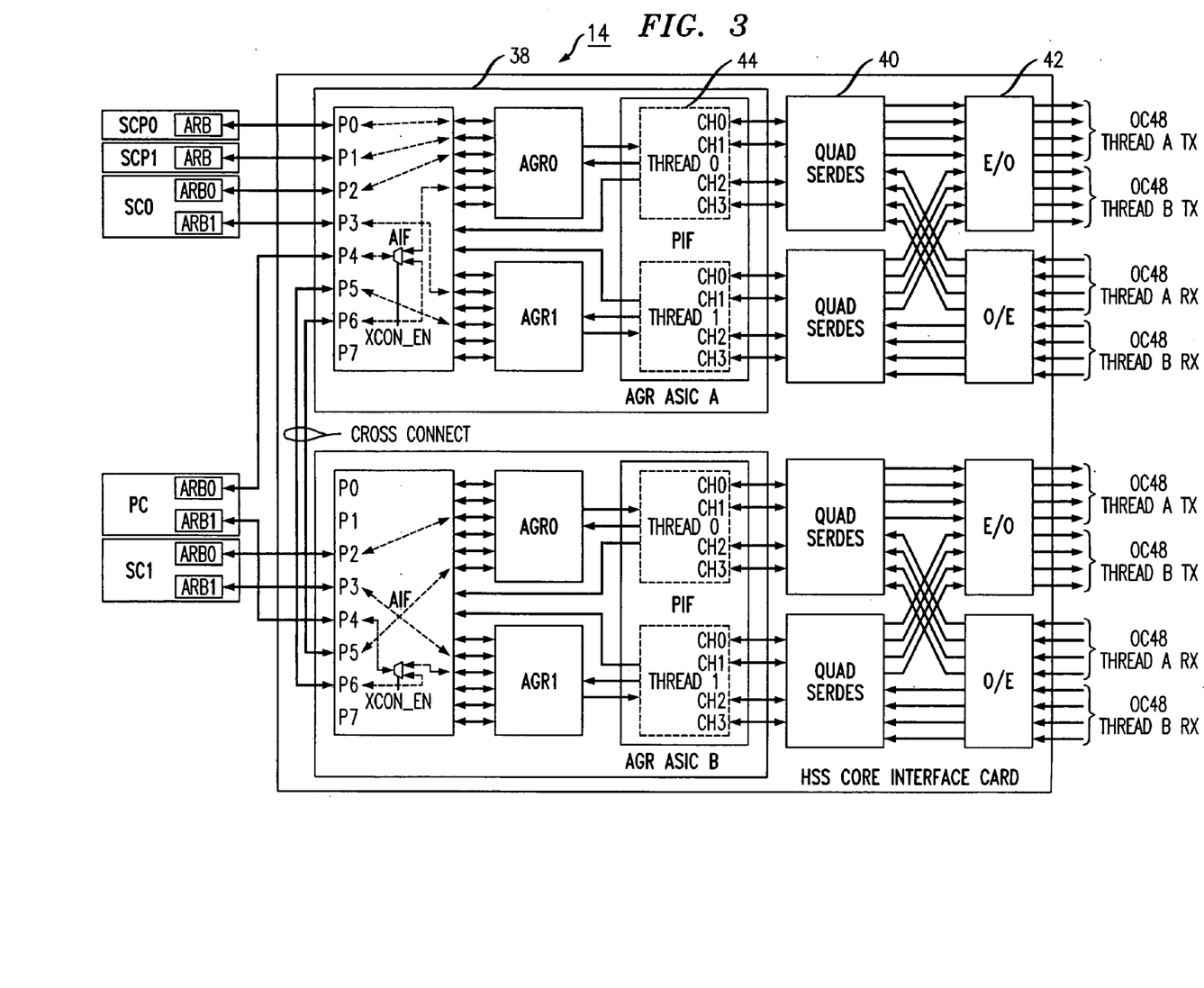
FIG. 3 is an exemplary block diagram of a core interface card for a high speed shelf.

The core interface cards 14 couple to redundant switch cores 16, 18. A core interface card 14 monitors its link to the core and reports status to the shelf control processor 36 on the service shelf. Referring to FIG. 3 in combination with FIG. 2, an exemplary block diagram of a core interface card 14 is shown. As shown, service cards 24, 26 couple to the core through an aggregator device 38 in the core interface card 14. Interconnections between the aggregator in the core interface and the arbiter blocks on the service cards are illustrated with double arrows. (FIG. 2).

Figure 6:
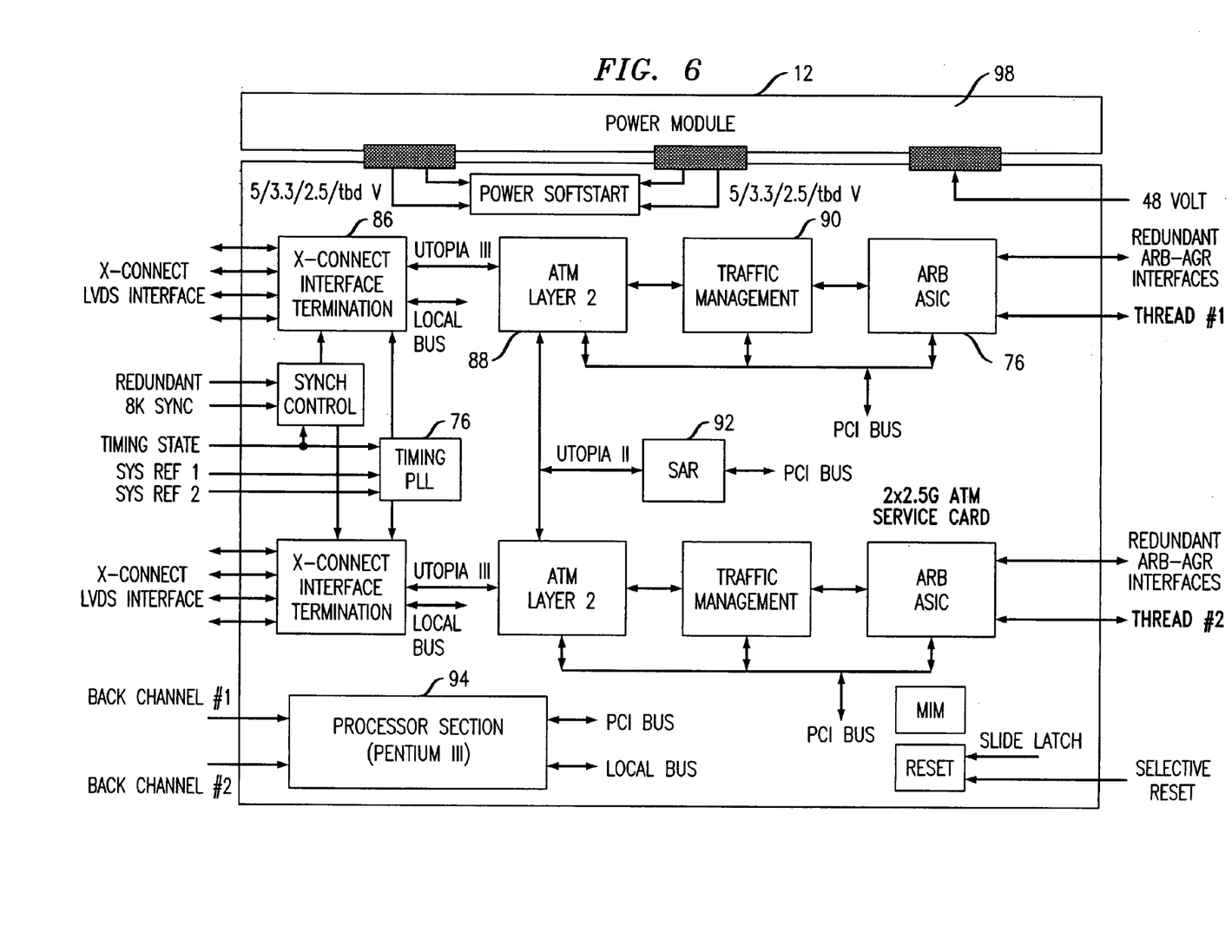
FIG. 6 is an exemplary embodiment of a higher level service card as used in connection with the present invention.

The aggregator device 38 acts as an interface between the service cards 24, 26 and the switching core and essentially distributes core traffic throughout the service shelf. The aggregator 38 acts as a datapath flow switch, directing flows to either the normally active service card slot or to the dedicated protection slot. Note that neither core bandwidth, nor bandwidth of the service cards (shown in greater detail in FIG. 6) is wasted by the aggregator cross-connect function to the service cards (FIG. 6). In all cases, the aggregator 38 will allow control information connectivity through the core to all attached service cards 24, 26 and shelf control processors 36. Although shown and described as an applications specific integrated circuit (ASIC), it would be understood that the functionality of the aggregator 38 as described herein may also be implemented using discrete components. As shown in FIGS. 2 and 3, the core side of the aggregator 38 couples to multiple serializer/deserializer blocks 40. The implementation and function of a serializer/deserializer would be well known to a person skilled in the art. The serializer/deserializers 40 couple to optical/electrical (O/E) components 42 in order to provide the interface to the switching core. Failure of a link will be detected by a serializer/deserializer 40 or the aggregator device 38 and reported to the shelf control processor 36 through a control interface on the aggregator. Failures may be detected, for example, by the loss of a clock signal corresponding to the link or an invalid parity across the link. Other types of failures that are detectable and that can be characterized as a link failure would be apparent to those skilled in the art. As will be explained, the shelf control processor 36 (in combination with the aggregator 38) trigger appropriate corrective action in response to a link failure. The aggregator 38 on the core interface card 14 also contains a thread switch function 44 for service card protection. The switch function 44 allows the core interface card 14 to steer traffic on a given thread to/from an active service card to a protection card. For the shelf, service card protection will be 1:2. The core interface card 14 (and the shelf control processor 36) will control the protection switching of the interface. In addition, as will be explained, an arbiter function on the service card can detect link failures on the basis, for example, of the receipt/non-receipt of link test cells.

Figure 4:
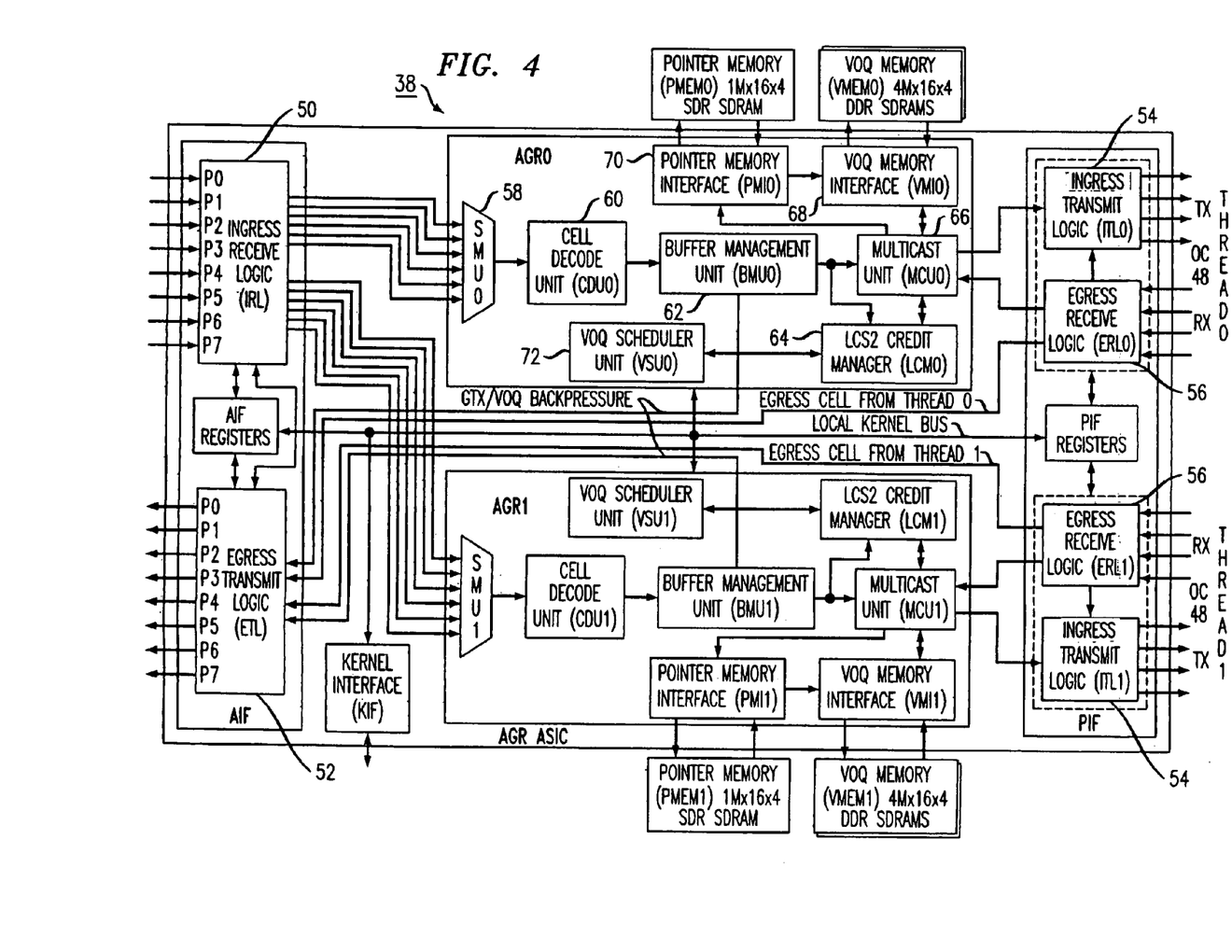
FIG. 4 is an exemplary block diagram of an aggregator function as used in connection with a multiservice switch.

FIG. 4 shows a functional block diagram of the aggregator device 38. The aggregator 38 includes ingress receive logic 50 and egress transmit logic 52 on the service card side. Egress transmit logic 54 and egress receive logic 56 are also found on the core side of the aggregator 38. There are two aggregation functions—AGR0 and AGR1—implemented in the aggregator (AGR) ASIC, each performing an aggregation of up to 6 independent data streams into, for example, a 2.5 Gbps or higher thread. These two aggregation functions are independent and the operation of one does not affect any state of the other. In one exemplary embodiment, each aggregator function AGR0, AGR1 includes a multiplexer unit 58 which couples to the ingress receive logic 50, a cell decode unit 60 which couples to the output of the multiplexer 58 and a buffer management unit 62 which couples to the output of the cell decode unit 60. A credit/grant manager function 64 and a multicast unit 66 each couple to the output of the buffer management unit 62. A virtual output queue (VOQ) memory interface 68 and a pointer memory interface 70 each couple to the multicast unit 66. A VOQ scheduler 72 couples to the credit/grant manager 64.

The AGR ASIC communicates with the service shelf cards through an arbiter (ARB) ASIC 76 over an 8-bit LVDS (low voltage differential signal) interface (FIG. 2), for example. As shown, the AGR ASIC has 8 ARB interface (AIF) ports. Four of these AIF ports can be configured to connect to either of the aggregation functions in the AGR ASIC. Of the remaining four AIF ports (P0–P7), two are connected to aggregation function 0 (AGR0) and the other two are connected to aggregation function 1 (AGR1). Thus, a maximum of six AIF ports can be connected to each aggregation function. In the ingress direction, each aggregation function statistically multiplexes a combination (maximum of 6 data streams) of OC-12, 2×OC-12, and OC-48c data streams into a 2.5 Gbps stream. In the egress direction, each aggregation unction broadcasts an OC-48 thread coming from the core to the six (6) ARB ASICS connected to that thread. Note that the internal cross-connect function of the AGR conserves core bandwidth and supports 1:N service card redundancy without wasting core bandwidth.

As discussed above, the AGR ASIC communicates with the switch core, for example, on OC-48 links through quad serializer/deserializer (Serdes) 40 and Optical/Electrical ports 42. The Serdes transmitter 40 serializes and encodes the data, e.g. 8B10B data, for proper transmission over the fiber link. The receiver will deserialize, decode and also synchronize the four channels (channel lock) before transmitting the data to the aggregator (AGR) ASIC 38. Optical/Electrical components take the electrical signals produced by the Serdes and convert them to optical signals for fiber link transmission and take optical signals from the link and convert them to electrical signals for Serdes processing. In one embodiment of the invention, for example, a 96-byte data cell is striped among four channels. This data cell includes the 84-byte packet and 12-bytes of control data. Data is transferred between the aggregator ASIC and each Serdes on a 4×8-bit unidirectional bus. This cell is transmitted, for example, in twenty-four 155.52 MHz-clock cycles.

The AGR ASIC 38 is used in high speed and low speed applications, where the respective service shelves are accordingly termed high speed service shelves (HSS) and low speed service shelves (LSS). In the HSS and LSS applications, the AGR 38 resides in the HSS and LSS core interface cards, respectively. In the exemplary embodiment of the high speed shelf 12, the core interface card in the HSS uses two AGR ASICS 38 and provides a 10 Gbps (4×2.5 Gbps) interface to the switch core. In the exemplary embodiment of the low speed shelf (see FIG. 5), the core interface card 80 in the LSS uses one AGR ASIC 38 and provides a 5 Gbps (2×2.5 Gbps) interface to the switch core. The AGR is software configurable based on the specific application.

In the exemplary embodiment, the AGR ASIC includes 8 AGR-ARB interfaces each with a data rate of OC-48. All of the eight AGR-ARB interfaces (AIF ports P0 through P7) are software configurable to operate the AGR ASIC in different configurations required for different shelves (e.g. the High-Speed Shelf and Low-Speed Shelf). Setting a corresponding port enable bit in AIF Port Control Register 0 & 1 can activate each interface. AIF ports P0 & P1 are connected to the aggregation function 0 (AGR0) and ports P6 & P7 are connected to aggregation function 1 (AGR1). Ports P2 through P5 can be connected to either aggregation functions (AGR0 or AGR1), depending upon the AGRn_SEL bit in the AIF Port Configuration Register. Therefore, at any time at most 6 AIF ports can connect to one OC-48 thread.

In the high-speed shelf, the core interface card 14 has two AGR ASICs 38 (AGR-A and AGR-B) residing on it and provides an aggregate bandwidth of 10 Gbps to the core. Each AGR ASIC 38 is connected to one 5 Gbps high-speed service card and to one of the two 2.5 G ARB interfaces on the protection card. One of the two AGR ASICs will also have a shelf control processor (SCP) card(s) connected to it.

Figure 5:
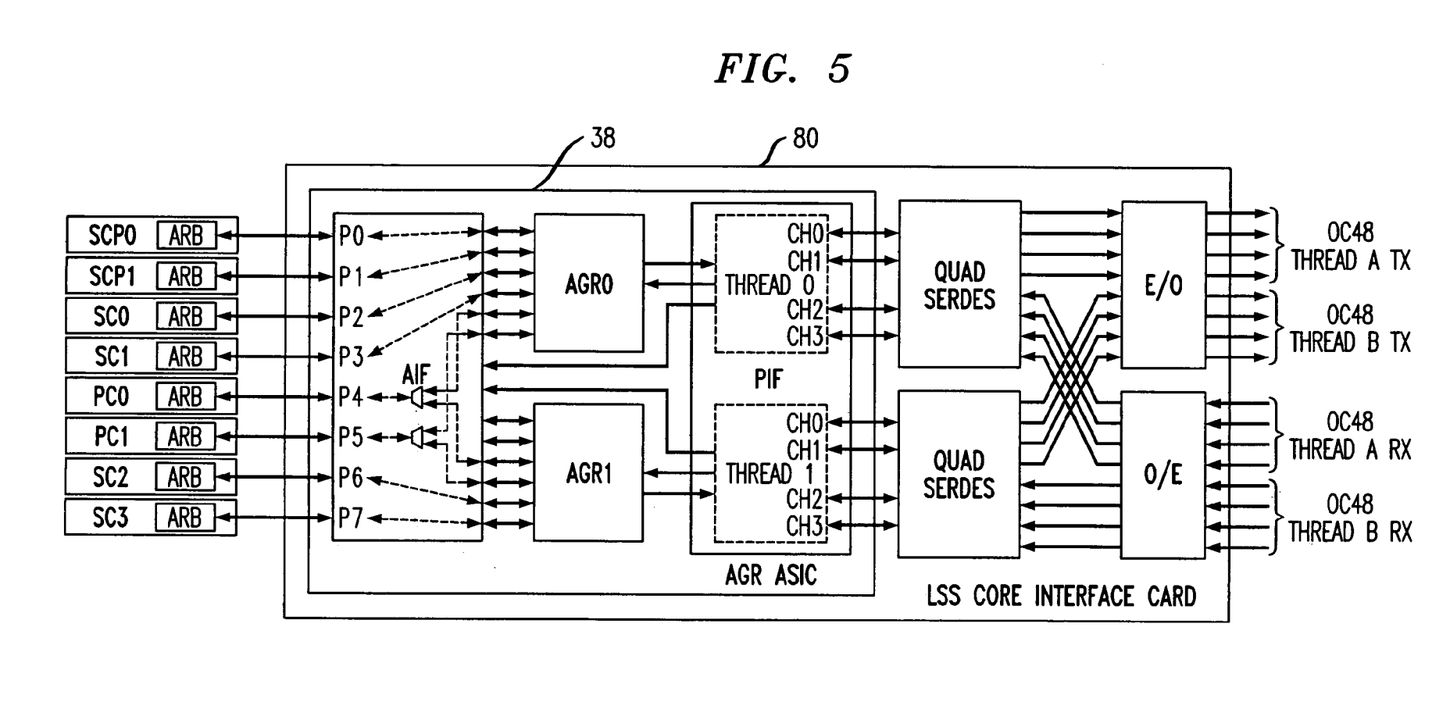
FIG. 5 is an exemplary embodiment of a core interface card for a low speed shelf.

In the low-speed shelf (FIG. 5), the core interface card 80 has one AGR ASIC 38 and provides two 2.5 Gbps aggregated threads to the core. The AGR ASIC interfaces with the ARB ASIC in 4 low-speed service cards, 2 protection cards, and 2 shelf control processor (SCP) cards. All low-speed cards have an average data rate of 2×OC-12, however, in burst traffic conditions, the interfaces can support a peak data rate of OC-48. FIG. 5 shows AGR in LSS core interface card.

Referring again to FIGS. 1 and 2, it can be seen that the service cards 24, 26 will receive flows from the redundant cores through the core interface card 14. An arbiter function (ARB) 76 in the service cards 24, 26 will monitor the end to end path of the flows through special in-band test messages (termed link test cells) over both cores. If a flow is failed, the destination ARB will automatically switch and accept traffic through the protection path from the redundant core and core interface card. The source ARB will always broadcast traffic and test messages through both cores. The AGR interfaces with an Arbiter device/circuit that resides on all service cards and shelf control processors 36 to complete the core interface. From a high level the ARB 76 is intended to merge traffic flows from each core as necessary, on a per flow basis, and act as a header translator and filter for traffic flows from the cores. The ARB and AGR will also provide flow checking and fault detection checking. A significant advantage of the present invention is the ability to switch individual flows without impacting other flows within the switching system and to not waste core bandwidth with 1:N service card protection.

Referring to FIG. 6, one exemplary embodiment of a high level service card 12 is shown. As illustrated, the service card is an ATM service card, although it would be understood that other types of service cards can be utilized, for example IP, frame relay, and TDM. The service card shown provides 2×2.5 Gbps threads and provides the ATM layer and traffic management functions for the service shelf. As shown, cross connect interface terminations 86 couple to the ATM (layer 2) processing blocks 88. The ATM blocks 88 couple to respective traffic management functional blocks 90 as well as to the ARB ASIC 76 providing the two threads. The ATM layer blocks 88 also couple to a segmentation and reassembly function (SAR) 92 that couples to a local processor 94 via a PCI bus. The service card also includes timing and power functions 98.

The Arbiter ASIC, or ARB ASIC 76, will be used in the switching system as a flow control mechanism for cell traffic as well as a test cell generator and receiver for system level flow verification. As with the aggregator device, although the exemplary embodiment is described with respect to an ASIC, it would be understood that such a device may also be implemented using discrete components. The ARB is utilized, for example, in the high speed shelf, the low speed shelf, and interfaces on one side to a physical layer device such as a scheduler, also known as a traffic manager or TM. On the opposite side, the ARB interfaces to the aggregator (AGR). The ARB ASIC includes a UTOPIA II bus for interfacing with a SAR for processor to processor communication. The ARB also supports an external memory interface for GMID (global multicast ID) to ECID (egress circuit ID) translation. The ARB ASIC contains a test cell generator and a test cell receiver to test online and off-line cell flows through the core via CRC checks.

The ARB resides on a service card and forwards user traffic (from the physical interface) to the core interface cards at an OC48 (2.5 Gbps) rate. The ARB receives traffic from the core interfaces and will forward traffic destined to its TM device. An ARB also resides on the shelf control processor (SCP). In the SCP application, the ARB interfaces to a SAR device to enable processor to processor communication and will not interface to a TM device.

Figure 7:
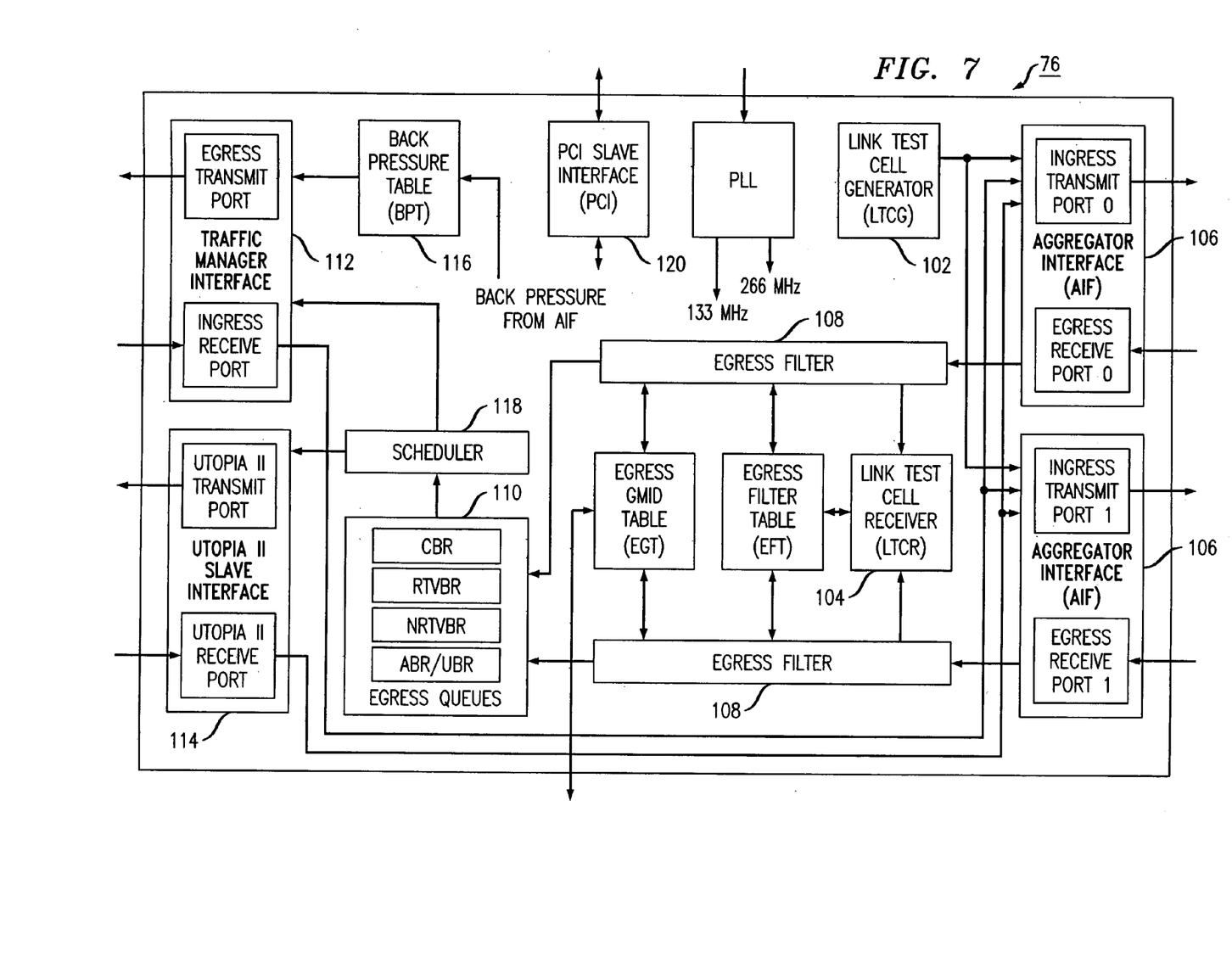
FIG. 7 is an exemplary block diagram of an arbiter function as used in connection with a multiservice switch.

Referring to FIG. 7, a functional block diagram of the ARB ASIC 76 is shown. The exemplary embodiment of the ARB includes six interfaces: a PCI (processor interface) interface, a physical layer interface (PI Sched RX and TX), a SAR interface (RX and TX), two AGR interfaces (RX and TX, one per core) and an external memory interface. As discussed previously, the ARB includes a link test cell generator 102 and a link test cell receiver 104 which will be used in the system to verify flow integrity. The link test cell (LTC) generator 102 and receiver 104 couple to the aggregator interface 106, the link test cell receiver 104 coupling through respective egress filters 108. The ARB also includes internal priority queues (four QOS levels) 110 for egress traffic, the inputs of which couple to the egress filter 108. The priority queues couple to egress transmit ports (TM and Utopia) 112, 114 through a scheduler 118. The egress filters 108 in the ARB provide a filtering function that is used to determine if the ARB should accept unicast and multicast cells from the AGRs.

From an ingress standpoint (with relation to the core), if the ARB 76 is in TM mode, user cells will enter through the physical layer interface TM. BIP8 calculations (bit interleaved parity across 8 bit boundaries) will be checked on a per cell basis and optionally drop BIP8 erred cells. Cells entering the ARB through the physical layer interface will be broadcast to both AGR ports (and sent to both cores). Internally generated link test cells will be combined with the user traffic in the ARB ASIC and sent to both AGR ports. The link test cell generator 102 can optionally back pressure the TM device using a back pressure table 116 to create space for test cell insertion. If no user cells or test cells exist, idle cells will be inserted to sustain the flow.

From an egress standpoint, cells will enter the ARB via one of two AGR interfaces. When a cell first enters the ARB, a check will be done to determine if the cell is a test cell, a unicast cell, a multicast cell, or an idle cell. Filters and checks will be done to forward the cell to the appropriate interface (TM/SAR or LTC receiver). BIP8 calculations will be checked on a per cell basis and optionally drop BIP8 erred cells. Cells destined for the TM/SAR are placed in one of four priority queues 110 based on a QOS field in the cell. Cells from both AGR interfaces are placed into the same queues. Cells will be read from the priority queues based on either a fixed priority or a programmable priority depending on scheduler mode and sent to the TM or SAR based on mode.

As discussed, support for 1:N service card redundancy is provided in the AGR 38. In the described embodiments of the HSS and the LSS one protection card (a hot standby) is provided for every two service cards. In order to provide the redundancy protection and allow for seamless traffic switchover between the protection card and service card and to provide per flow protection switching, an address mapping scheme, termed a Z-mapping scheme (after the different address fields) is implemented.

All the ARB ASICS 76 in a switch utilizing the present invention interface are uniquely identified from a flow/connection standpoint based on an X.Y.Z addressing scheme. The X portion of the address represents an 8-bit OC192 port ID used for addressing one of 256 fabric output ports. A 2-bit Y field addresses the four OC48 ports within an OC192 port addressed by X. That is, Y specifies one of the four OC48 links between the switching core and a core interface card. A 3-bit bit Z field addresses an ARB ASIC or AIF port associated with an OC48 thread (PIF thread). The X.Y.Z value is stored in the packet header and is used by the switch fabric in the core and the line card on the service shelf to route packets to the correct destination card/port. It would be understood that the addressing scheme and addressing fields of the exemplary embodiment can be modified (e.g., expanded or contracted) depending on their application.

On the egress side, all user data cells and test cells received from the core are broadcast to all ARBS associated with an OC48 PIF thread. These cells contain a 3-bit E_Z (egress) field that identifies one of 8 destination ARBs connected to the AGR. Each ARB also has a unique Z ID stored in its Z[2:0] register. Upon receiving a cell from the AGR, the ARB compares the E_Z[2:0] field of the incoming cell with its Z ID. If the Z values match, the cell is processed, otherwise the cell is dropped.

When a service card fails, the associated egress traffic is switched to a protection card. In order to accomplish the switching, the AGR uses a 3-bit wide, eight entry deep Z-mapping table with each entry associated with one of the eight AIF ports. Each entry in the Z-mapping table contains the current mapped/unmapped Z address of the corresponding AIF port. The egress transmit logic in the AGR receives a cell from the egress receive logic, it looks up the Z mapping table used to overwrite the E_Z field of the outgoing egress cell. During normal operation, each entry in this table contains the Z address of the ARB connected to the associated AIF port. When one of the service cards fails, the Z address of the failed card and the protection card are swapped by the associated software. The Z address of the failed service card is now mapped to the Z address of the protection card and vice versa. Consequently, the egress traffic destined for the failed service card will now be accepted by the protection card.

It is desirable to have the Z-mapping table lookup disabled for test cells. For example, when a service card is being protected, it must still be able to receive test cells destined to it. Thus, test cells destined for the failed service card must not be mapped whereas user data cells destined for the same card must be mapped. The IGNR_Z bit in the egress cell header is therefore provided to override the Z-mapping lookup table. Hence, the Z-mapping table lookup will only be performed when the IGNR_Z bit is set to 0.

Test Flow Verification of Flow Paths

In accordance with the present invention, a flow of test cells is used to verify link integrity of each unique data flow path within a multiservice switch. As discussed previously, the present invention uses every ARB to ARB path over either switching core as a link. The ARB's are uniquely identified from a flow/connection standpoint based on their system level address, e.g., a "X(OC-192).Y(OC-48).Z(SCP/SAR)" location. Accordingly, the ARB configuration is different for each shelf type in the multiservice switch.

Figure 8:
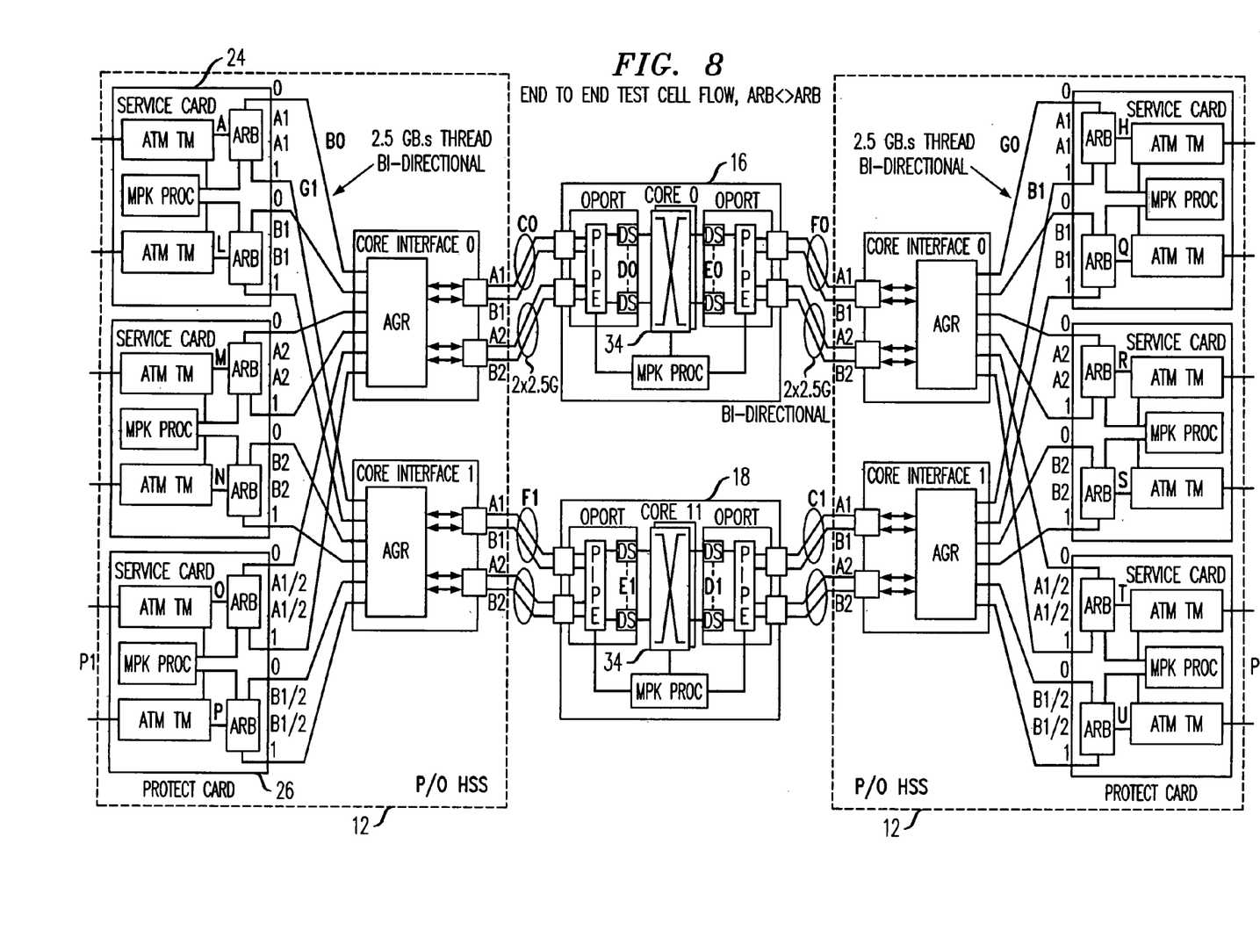
FIG. 8 illustrates an exemplary end-to-end test flow in accordance with the present invention between arbiter devices in a multiservice switch.

With reference to FIG. 8, it is illustrated that each ARB to ARB path is treated as an end to end protection path. A flow path selection decision through a respective core is made based on this end-to-end flow with no information required for the service shelf to core path. In this regard, it is much like assuming the service shelf 12 to core 16, 18 link is akin to a section terminating in a SONET system. An ARB to ARB link failure can be on a service card 24 whereupon a service shelf processor (not shown) would have to effect a service card 24 to protect service card 26 switchover to restore service. For the most part, however, the ARBs typically remain operational and the failures exist outside the service card. Such failures may occur, for example, as part of the core interface card, core link or some portion of the core itself.

The overall approach to on-line fault detection and restoration assumes that the switching cores are NOT in lock step. A goal that is achieved by the present invention is to isolate link/flow failures and restore services to those flows without impacting other traffic in the system thereby increasing overall availability. The approach is end-to-end flow verification, (note that a flow is defined as a path from any ARB to ARB within the system without delineation to a per VC level). For on-line verification this occurs for both Cores. The number of flow paths is based on the total number of 2.5 G threads for the 2 Tbs system as well as the additional protection ports that will have ARB's. That is, each ARB needs to be able to verify the path to all other active ARB/s as well as the protection paths.

FIG. 8 shows the end to end flow path from ARB to ARB for an HSS type application in accordance with the present invention. Traffic from ingress to egress will travel over both cores, CORE0 and CORE1. Thus, the communications traffic for flows originating through ARB:A are passing over the path A>B0>C0>F0>G0>H to ARB:H. By the same token, traffic also flows from ARB A through the alternative core over the path A>G1>F1>C1>B1>H to ARB:H. Note that the connections are bi-directional in nature such that at the same time traffic from ARB:H is passing through CORE0 from G0 to F0 and terminating in ARB:A and ARB:L>P (one or more of ARB:L through P depending on whether any of the flows are multicast) as appropriate. However, from a redundancy standpoint, the bi-directional paths are not logically connected.

Within the internal header of each cell in a flow path, there will be a CT (1:0), Cell Type, field indicating to the various monitoring/routing functions that a cell is a test cell. The Test Cell will be part of the highest priority service across the multiservice switch. The Link Test Cell will incorporate the source X.Y.Z. address with CRC protection such that the receiving ARB knows the path through the switch.

Under the control of the local processor on the service card the ARB is directed, on a per flow basis, to pass CORE0/CORE1 flows to the TM function as a function of the integrity of the links. The integrity of these flows is ascertained via the test cells that flow over each active link. For example, assume that path F0 is down. In this case, ARB:A will accept traffic from ARB:H and ARB:Q over path C1, CORE 1, while flows from ARB:RS would continue to flow over CORE 0.

In all cases the ARB is generating and detecting for the presence of link flow failures on both the on-line paths, through CORE 0, as well as the paths through CORE 1. In this way the ARB uses the test cell integrity as verification of the overall end to end path through CORE 0 and CORE 1 and selects the appropriate path locally. No high level coordination is required. When an ARB detects a failure and takes action, it signals its action to the local processor on the service card. Actual switchover can be either HW initiated or exclusively via SW. In this way switchover can be coordinated locally by the processor on the service cards. This is similar to how failures are detected and switchover is coordinated at a network level.

Figure 9:
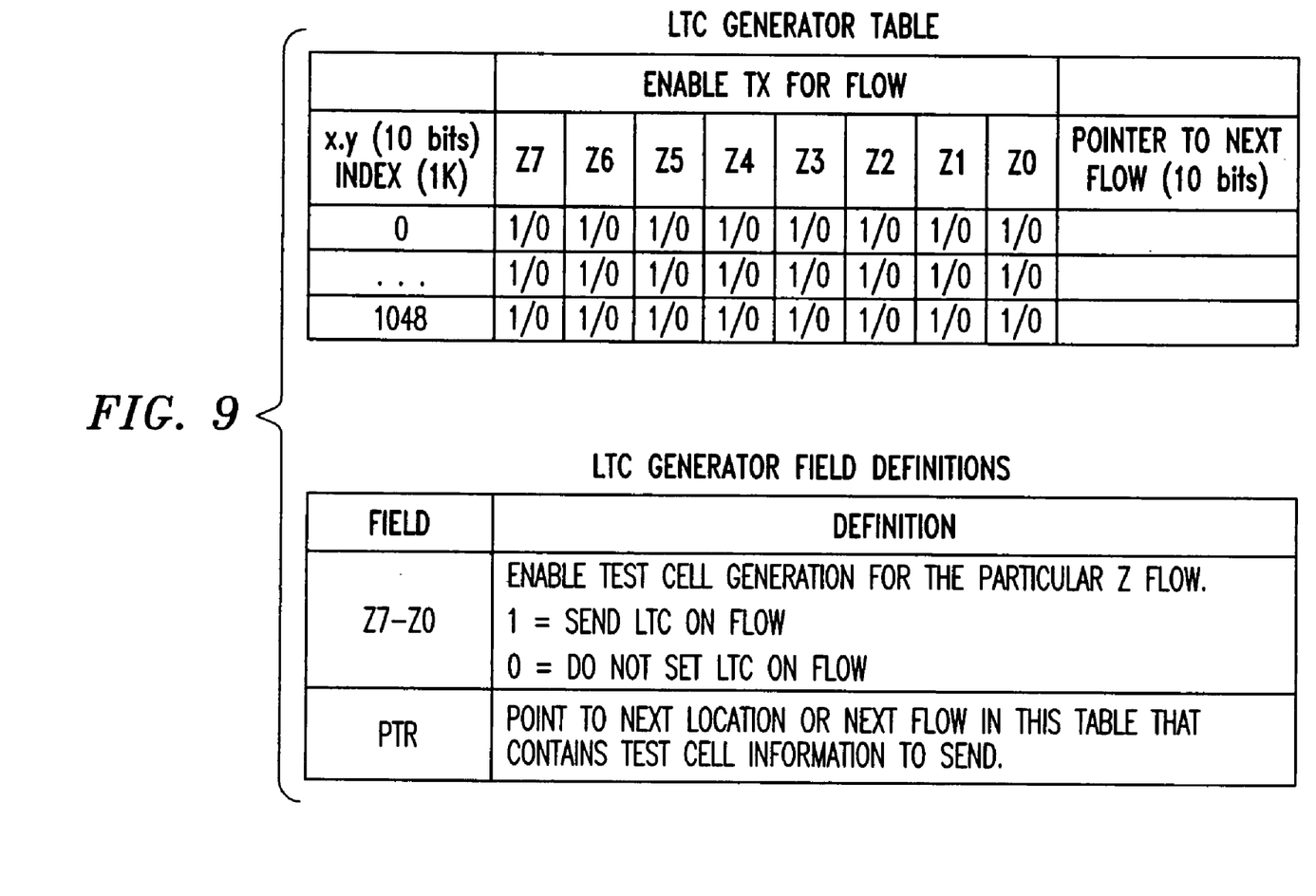
FIG. 9 shows an exemplary link test cell generator table.
Figure 10:
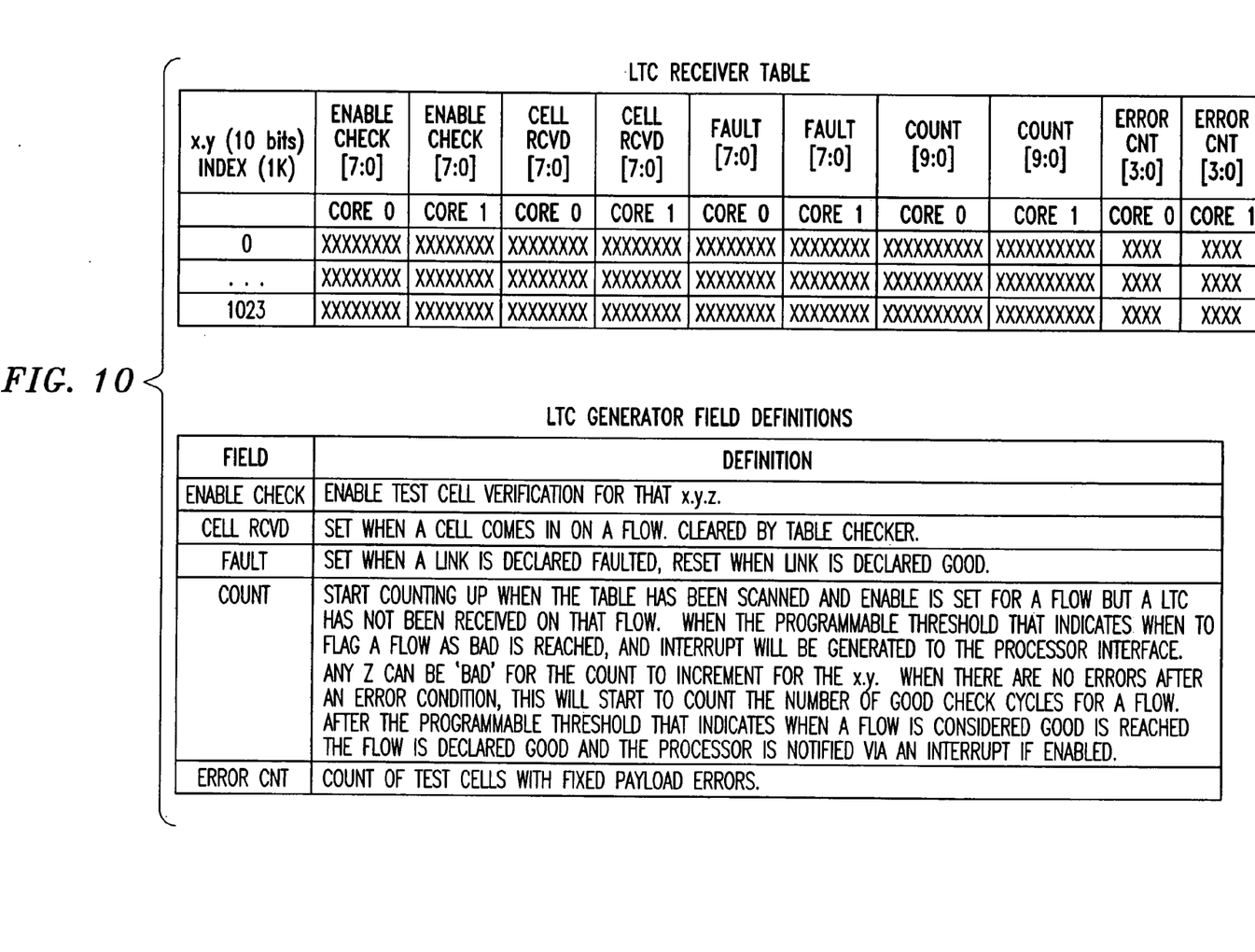
FIG. 10 shows an exemplary link test cell receiver table.

In terms of an on-line test flow, each ARB has two internal tables. Referring to FIGS. 9 and 10, a first table 200 is for the test cells to be generated and the other table 210 (FIG. 10) is for the expected test cells from other ARBs. These are set up by the node level processor as paths to verify for coordination at the NODE level as flows are brought up at the switch level. The ARB monitors for proper NODE level operation with minimal SW interaction. More specifically, the ARB sends out test cells at a rate programmed by the service card processor. Only the ARB actually generates or terminates on-line test cells. Referring to FIG. 8, it can be seen that the test cells from ARB:A flow from the service card to the core interface card and are monitored by the AGR for service card to core interface (SC<>CI) link integrity. This would be via use of a BIP8 check, for example, as part of the internal cell payload. Errors over this link are noted to the shelf control processor for making the service card, 1:N, protection switchover. Note that the AGR when monitoring test cells does not have to monitor uniquely each end to end flow, but just that test cells are being received properly from the ARBs that it is connected to, thereby minimizing complexity. In fact, an AGR does not differentiate between user traffic, which also has a cell parity check and test cells. The AGR provides information to the shelf control processor as to the ARB to AGR link. The AGR only has to have the capability to monitor for Link Test Cell or ARB/Processor generated test cells to verify link integrity. The same is true for the core switching fabric 34. This removes the need to have test cell injection at the AGR/core switching fabric level. However, as will be explained, the AGR/ARB must be able to capture unique test cells that are launched from ARB's.

It should be noted that test cells are neither generated nor received uniquely from port protection cards that are "off-line". Test cells, and VC control cells, are intended to follow the AGR switchover, re-mapping, when port switchover occurs thus making this transparent to the rest of the system. The test cells from ARB:A (FIG. 8) are passed through the AGR as noted and sent to the CORE. The on-line core input/output mechanism, termed a PIPELINER passes test cells through from the CORE unchanged but monitors for cell integrity via a local link check from AGR to PIPELINER and makes this available to a respective core control processor. The on-line PIPELINER does not specifically "look into" the test cells or user data cells but provides overall link operation information to the core control processor.

From an egress standpoint as shown in FIG. 8, cells passing out of CORE 0 are received by the AGR and again monitored for integrity and passed on to the ARB. Again, the AGR has the capability to monitor test cells to support off-line fault isolation. Test cells received by the AGR are routed to the appropriate ARB based on the X.Y.Z. routing information. The ARB receives test cells from the on-line ARB's and uses this information to fill in the flow table as to link integrity. Should the ARB fail to receive flow integrity test cells from a specific flow after a programmed soak period, it will generate an interrupt to the local processor for restoration of service. Note that flow integrity is verified largely in hardware and switched end to end by the service card/shelf control processors largely independently of the overall node control processor. Thus, switchover times can be minimized. However, as part of the switchover decision, a shelf control processor also has to ascertain the status of the CI and SC cards to determine if it should switch in the SC protect card. In all cases a service card processor or node control processor can override a local decision as may be appropriate.

When an ARB switches a particular flow from one CORE to the other CORE it does not differentiate between core interface failures or CORE type failures, but just end to end flows to re-establish service. The details are done off-line. An ARB "accepts" flows on a per link basis from CORE 0 to the CORE 1 without impacting flows over intact links in any manner based on test cells over the NODE level "network". Accordingly, ARB:A may be sending and receiving from both COREs simultaneously and combining them into one flow at point A to the ATM-TM function. Because the CORES are not synchronized this creates the problem that two 2.5 G flows, one from CORE 0 and the other from CORE 1, converge on a single ARB port to the TM device.

A feature of the multiservice switch present on the CORE egress side is that a QOS based back-pressure from the service shelf can operate to push congestion in the ARB first back to the AGR and then to the CORE on a per 2.5 G thread basis. The service shelf can stop cell flow or create "holes" by sending a bit that enables or disables cell flow on a time slot for each QOS level in the cell from the service shelf to the CORE. In this way, the ARB can reduce the overall combined flows below 2.5 GB/s, for example, to the TM function. This also prevents cell dropping at the AGR. Short term buffering, because of the latency in the Core from the time that a "Hole Request" is sent to the Core and a "hole" appears at the egress AGR, is required.

An important point with respect to the per flow fault detection and restoration is that the on-line fault detection and restoration is distributed and requires no interaction with the "higher level" shelf control processor or node control processor under most conditions. The detection and restoration process is handled on a service card basis with the local processor having the information available from hardware to make a timely decision. An exception is if switching to the service shelf port protect card is required, which would then require a shelf control processor function. On-line fault monitoring is largely HW based with fault indication elevated to the local processor for corrective action. Subsequent to the corrective action, implemented for example by way of software, the service will stay on the Core selected by the ARB until action is taken by an operator or other triggering event to return service to CORE0.

After the failed cards have been replaced and verified as being operational, then service, under operator direction, can be returned to the original CORE/Path. Service will not be switched back automatically.

Briefly summarizing the present invention, it can be seen that within the multiservice switch, ARBs generate and monitor test cells to determine link integrity for both core interfaces. The link test cell generator will contain a table with information as to which link test cells should be transmitted. The link test cell generator sends test cells to destinations as specified in a destination table. Link test will be sent to each AGR (core) interface (if enabled). The test cell receiver will contain a table with information as to the status of each link and from which link it should receive test cells. Failure to receive a cell within a specified time for a programmable number of cycles will cause the link to be declared faulted. A processor interrupt will be generated if not masked and, if enabled, the ARB will automatically update the egress filter table to switch to the other core. Once a link is declared faulted, the test cell receiver will continue monitoring the link and declare the link good if test cells are received are again received on that link for a specified number of cycles. The link test cell generator will support a mode where it will send a special test cell (end checking test cell (ETC)) to all programmed destinations. ETCs instruct the receiver to disable further checking from this source. yh The foregoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Many other modifications and applications of the principles of the invention will be apparent to those skilled in the art and are contemplated by the teachings herein. Accordingly, the scope of the invention is limited only by the claims appended hereto.

What is claimed is:

1. A method of operating a multiservice packet based switch including redundant switching cores, said method comprising the steps of:
   providing a plurality of ingress and egress communications traffic flow controllers, each of said ingress flow controllers directing one or more threads of said communications traffic over one or another of said redundant switching cores;
   monitoring communications flow paths traversing ones of said ingress flow controllers, one of said redundant switching cores and corresponding ones of said egress flow controllers;
   detecting a failure in one of said communication flow paths at an egress flow controller in said failed flow path; and
   switching said flow path to a protection path via another of said switching cores, whereupon flow paths that are unaffected by said failure remain in place and do not switch cores;
   wherein said egress flow controller in said failed flow path operates to detect said path failure and to effect said switching of said failed flow path to said protection path independently of communication with a corresponding ingress flow controller, said path switching being thereby transparent to said corresponding ingress flow controller.

2. The method of claim 1, wherein communication flows in opposite directions between same ingress and egress controllers need not traverse a same one of said switching cores.

3. The method of claim 1, wherein said step of monitoring flow paths is accomplished using link test cells generated from a link test generator in said ingress flow controller to a link test cell receiver in said egress flow controller.

4. The method of claim 3, wherein aggregator and core functions within said switch also monitor for presence of link test cells.

5. The method of claim 3, wherein a flow path is considered to be restored upon receipt of test cells for a period of time.

6. The method of claim 3, wherein said ingress flow controllers are operable to send special test cells to all programmed destinations to disable further test cell checking related to said ingress flow controller.

7. The method of claim 3, wherein each of said test cells includes a hierarchical address having multiple fields pertaining to various type links within said switch for traversal thereover.

8. The method of claim 1, further including the step of altering a filter table in said egress flow controller upon detection of a flow path failure to thereby utilize said flow path from said another switching core.

9. The method of claim 1, wherein said ingress flow controller need not be notified of said switching of said flow path to said another switching core.

10. The method of claim 1, wherein said redundant switching cores need not operate in lock step.

11. The method of claim 1, wherein said egress flow controllers include a back pressure mechanism to reduce overall combined flows below a given rate that is suitable for a traffic management function therein so as to avoid cell loss.

12. A packet based multiservice switch device; comprising:
   at least two redundant switching cores;
   a plurality of ingress and egress communications traffic flow controllers, each of said ingress flow controllers directing one or more threads of communications traffic over one or another of said redundant switching cores;
   said flow controllers monitoring communications flow paths traversing ones of said ingress flow controllers, one of said redundant switching cores and ones of said egress flow controllers, whereupon detection, at an egress flow controller, of a failure in a monitored link produces switching of said failed flow path from said one switch core to a protection path via said another switch core, and further whereupon said flow paths that are unaffected by said link failure remain in place and do not switch cores;
   wherein said egress flow controller in said failed flow path operates to detect said path failure and to effect said switching of said failed flow path to said protection path independently of communication with a corresponding ingress flow controller, said path switching being thereby transparent to said corresponding ingress flow controller.

13. The device of claim 12, wherein communication flows in opposite directions between same ingress and egress controllers need not traverse a same one of said switching cores.

14. The device of claim 12 wherein said ingress flow controllers include a link test cell generator and said egress flow controller includes a link test cell receiver, monitoring of flow paths being accomplished using link test cells generated from a link test generator in said ingress flow controller to a link test cell receiver in said egress flow controller.

15. The device of claim 14, wherein aggregator and core functions within said switch also monitor for presence of link test cells.

16. The device of claim 14, wherein a flow path is considered to be restored upon receipt of test cells for a period of time.

17. The device of claim 14, wherein each of said test cells includes a hierarchical address having multiple fields pertaining to various type links within said switch device for traversal thereover.

18. The device of claim 14, wherein said link test cell generator is operable to back pressure a traffic manager in said ingress flow controller to create space for test cell insertion.

19. The device of claim 12, further including a filter table in said egress flow controller alterable upon detection of a flow path failure to thereby prompt utilization of said flow path from said another switching core.

20. The device of claim 12, wherein said ingress flow controller need not be notified of said switching of said flow path to said another switching core.

21. The device of claim 12, wherein said redundant switching cores need not operate in lock step.

22. The device of claim 12, wherein said flow controllers include a back pressure mechanism to reduce overall combined flows below a given rate that is acceptable for a traffic management function therein.

23. The device of claim 12, wherein said ingress flow controllers are operable to send special test cells to all programmed destinations to disable further test cell checking related to said ingress flow controller.

* * * * *